M. KARBOUSKI.
INSECT TRAP.
APPLICATION FILED JAN. 5, 1920.
1,386,408.
Patented Aug. 2, 1921.
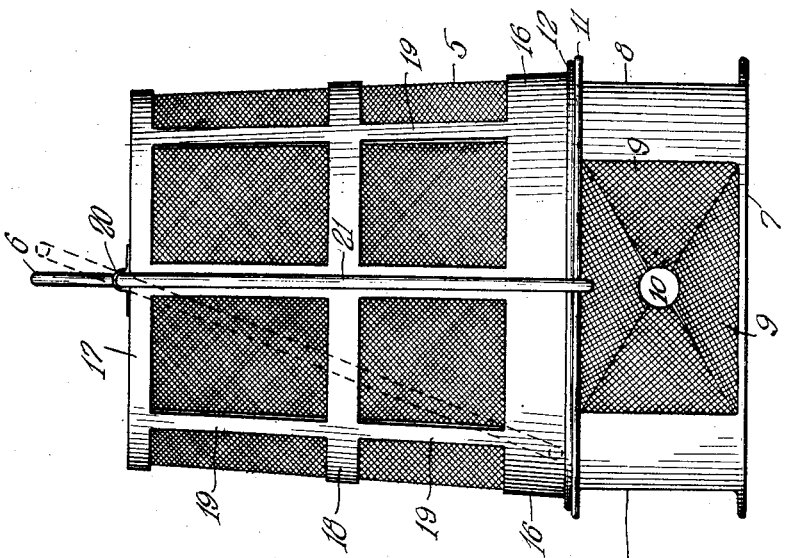
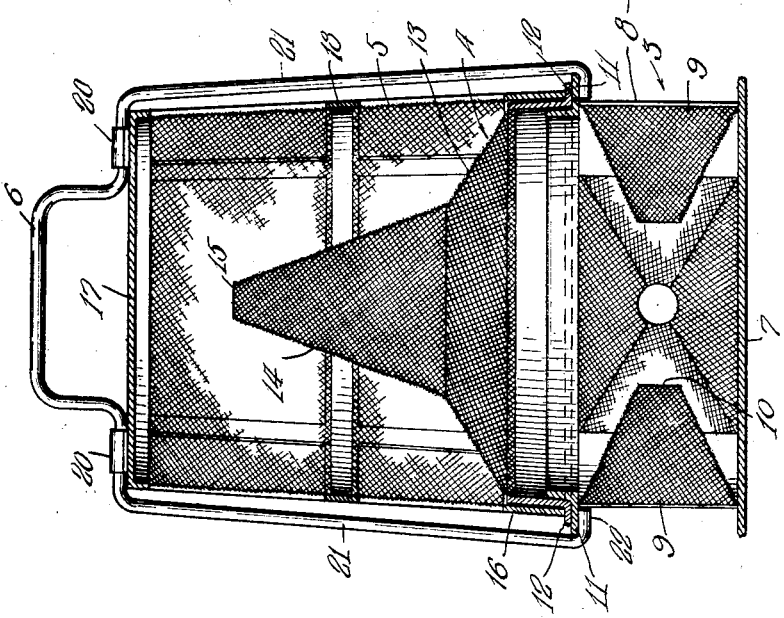
Inventor:
Martin Karbouski.

UNITED STATES PATENT OFFICE.

MARTIN KARBOUSKI, OF CICERO, ILLINOIS.

INSECT-TRAP.

1,386,408. Specification of Letters Patent. Patented Aug. 2, 1921.

Application filed January 5, 1920. Serial No. 349,477.

*To all whom it may concern:*

Be it known that I, MARTIN KARBOUSKI, a citizen of the United States, residing at Cicero, in the county of Cook and State of Illinois, have invented certain new and useful Improvements in Insect-Traps, of which the following is a specification.

The invention relates to traps.

One of the objects of the invention is to provide an effective trap especially well adapted to capture insects, such as roaches, water bugs, ants, crickets, and the like, and small animals such as mice or the like.

Another object is to provide a trap having three major units, separable for cleaning, comprising the base or receiving receptacle; a superimposed, separable, intermediate receptacle having a central uprising conical part with an entrance opening in the apex of the cone, and a storing receptacle above the intermediate receptacle, all of which receptacles or units are separable and which may be held together by means of a peculiar handle structure which also serves as a latch for detachably securing the trap units together.

In the drawings:—

Figure 1 shows a central section in elevation of the device.

Fig. 2 shows an elevation of the device at right angles to the sectional parts shown in Fig. 1.

In the drawings 3 shows the base unit or receptacle in which the insect or animal is received. 4 is the intermediate conical unit and 5 is the superimposed storing receptacle or unit. 6 is a handle arranged to hold the receptacles or units together.

The receptacle 3 is provided with a base plate 7 upon which is erected a circular housing 8. The housing 8 is provided with a series of inturned cone portions 9 having openings 10 at the apex of each. The parts 9 are preferably made of wire fabric of rather fine mesh, such as that used for window screens, or the like, and the housing portion 8 may also be made of similar fabric or it may, in lieu thereof, be made of sheet metal. Upon the upper edge of the housing 8, of the base unit, there is a flange 11 which supports the units 4 and 5. The conical member 4 is provided on its lower edge with a similar flange 12 that rests immediately upon the flange 11 which supports the conical member 13 and the integral more angular portion 14 of the cone. The unit 4 is also, preferably, made of wire fabric, such as heretofore referred to, and is provided with an opening 15 at the apex of the portion 14, so that the insects may have free entrance into the storing unit 5. The unit 5 is provided with a straight base ring 16, which rests upon the flange 12 of the unit 4. Storing unit 5 is closed at its top end by a wall 17 and it is reinforced between the base ring 16 and the top wall 17 by a ring 18 and by connecting vertical parts 19, to give greater strength to the structure. The handle 6 is pivoted to the top plate 17, as at 20, and has downwardly extending arms 21 inturned as at 22 to underlie the flange member 11 and thus hold the units together. The downwardly extending arms 21 are somewhat resilient, so that the under extending portions 22 may be brought free of the flange 11, as shown in dotted lines in Fig. 2.

The three members or units, 3, 4 and 5, of the structure, are separable, one from the other. To take the trap apart, it is only necessary to move the handle into the position shown in broken lines in Fig. 2, whereupon the inturned ends 22 thereof will be removed from their positions under the flange 11 of the base unit 3, and thereupon the storing unit 5 may be lifted from its position on the flange 12 of the intermediate unit 4, and the latter may be lifted from its position on the flange 11 of the base unit. This is a great advantage as a means for emptying the trap of the captured insects or animals, and it is a great convenience because it renders all parts of the trap freely accessible for the purpose of cleaning. It also renders the trap convenient for placing the bait in the base unit 3.

One of the advantages possessed by the trap is that there are no movable doors which may be inadvertently left open or be forced open in service and allow the escape of the immured animals and insects. No door is needed because the units composing the trap may be separated readily after the handle is moved to dotted line position. Moving the handle to full line position, after the units are assembled together, prevents the units from separating.

While I have herein shown a single embodiment of my invention for clear disclosure, it will be manifest that changes may be made in configuration and arrangement of the parts within the scope of the appended claims.

Having described my invention, what I claim as new and desire to secure by Letters Patent, is:—

1. A trap having in combinative association a receiving, base unit provided with an angular flanged ring bounding its upper edge; an intermediate, separable cone shaped unit, having an opening at its apex and having an angular flanged ring bounding its lower edge for support on the flanged ring of the base unit, and a separable, superimposed, storing unit having a ring bounding the opening at its lower edge for support on the flanged ring of the cone structure, and means to hold the units together.

2. A trap comprising three separable units; a base unit with a plurality of inwardly extending entrance cones having openings in their smaller ends; a flanged ring surrounding the upper edge of the base unit; a separable, vertically extending cone shaped unit having an opening in its apex; a superimposed, storing unit surrounding said cone, supported by the base flange, and a handle pivotally supported on the top of said storing unit having diametrically opposite, depending arms, carried by said handle, at each side thereof and extending to the flanged ring of the base unit when the units are assembled, and having inturned terminal ends to underlie said flanged ring of the base unit to hold the units together.

3. In a device of the character described, a lower member provided at its upper end with a reinforcing ring having a vertically disposed flange and a horizontally disposed flange, an upper member provided at its lower end with a reinforcing ring adapted to fit snugly about the vertical flange of the ring carried by the lower member, a handle member rockably mounted on the top of said upper member and disposed diametrically thereof, and depending arms carried by said handle at each end thereof and extending the full length of the top member at opposite sides of the same, said arms being provided at their lower ends with inturned portions adapted to engage beneath the horizontal flange of the ring carried by the lower member for detachably securing both of said members together.

4. In a device of the character described, a lower member provided with an outer annular projection, an upper member adapted to fit upon said lower member, a handle member rockably mounted upon the top of the upper member diametrically thereof for transporting the same, and downwardly diverging depending arms carried by said handle at each end thereof and provided at their lower ends with inturned members adapted for engagement beneath the annular projection of the lower member of the device for securing said lower member to said upper member.

In testimony whereof I hereunto subscribe my name.

MARTIN KARBOUSKI.